United States Patent [19]
Faigle et al.

[11] Patent Number: 5,609,360
[45] Date of Patent: Mar. 11, 1997

[54] AIR BAG INFLATOR

[75] Inventors: Ernst M. Faigle, Dryden; Tracy S. Sparks, Lapeer; Richard J. Thompson, Imlay City, all of Mich.

[73] Assignee: TRW Vehicle Safety Systems Inc., Lyndhurst, Ohio

[21] Appl. No.: 445,652

[22] Filed: May 22, 1995

[51] Int. Cl.⁶ ................................................. B60R 21/26
[52] U.S. Cl. ............................ 280/740; 280/741; 55/485
[58] Field of Search .................................. 280/741, 736, 280/740, 742; 55/487, 485; 102/530, 531; 422/164, 165, 166, 167

[56] References Cited

U.S. PATENT DOCUMENTS

| | | | |
|---|---|---|---|
| 2,724,457 | 11/1955 | Besser | 55/485 |
| 4,129,430 | 12/1978 | Snow | 55/485 |
| 4,414,902 | 11/1983 | Strasser et al. | 280/741 |
| 4,561,675 | 12/1985 | Adams et al. | 280/741 |
| 4,817,828 | 4/1989 | Goetz | 280/736 |
| 5,248,162 | 9/1993 | Levosinski et al. | 280/740 |
| 5,397,543 | 3/1995 | Anderson | 280/742 |

FOREIGN PATENT DOCUMENTS

| | | | |
|---|---|---|---|
| 546791 | 6/1993 | European Pat. Off. | 280/736 |
| 4005768 | 8/1991 | Germany | 280/736 |
| 5-178157 | 7/1993 | Japan | 280/736 |
| 1406067 | 9/1975 | United Kingdom | 280/736 |

OTHER PUBLICATIONS

Brochure Page (best copy available) from New Can Co. Incorporated, One Mear Road, P.O. Box 421, Holbrook, Massachusetts, 02343.

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An air bag inflator (10) includes an ignitable gas generating material (50), an initiator (36) for igniting the gas generating material (50), and a tubular wall (100) defining a combustion chamber (54) containing the gas generating material (50). A plurality of gas flow openings (150) extend radially outward from the combustion chamber (54) through the tubular wall (100). A filter (102) extends circumferentially and axially over the tubular wall (100). The tubular wall (100) includes a structure (160) defining a space which provides plenum (170) extending radially outward from the gas flow openings (150) to the filter (102).

24 Claims, 8 Drawing Sheets

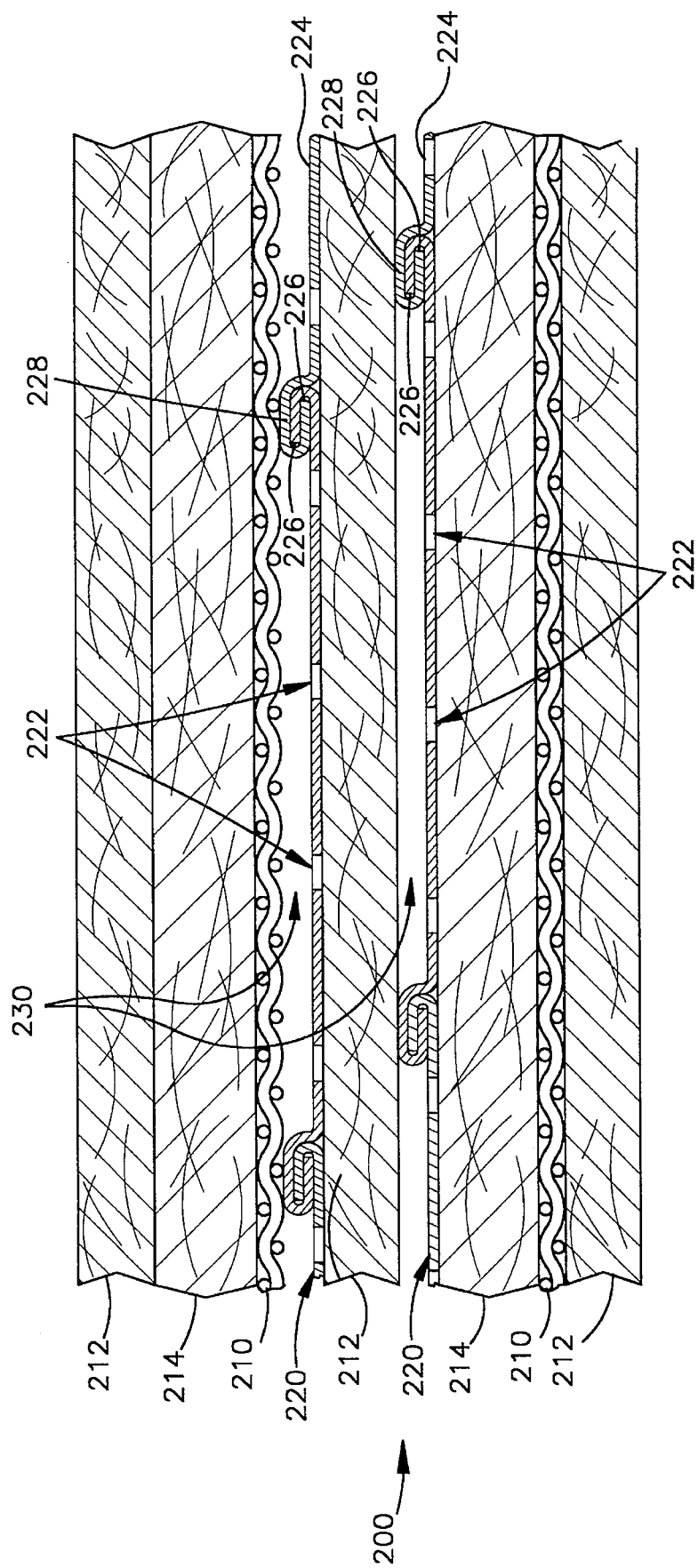

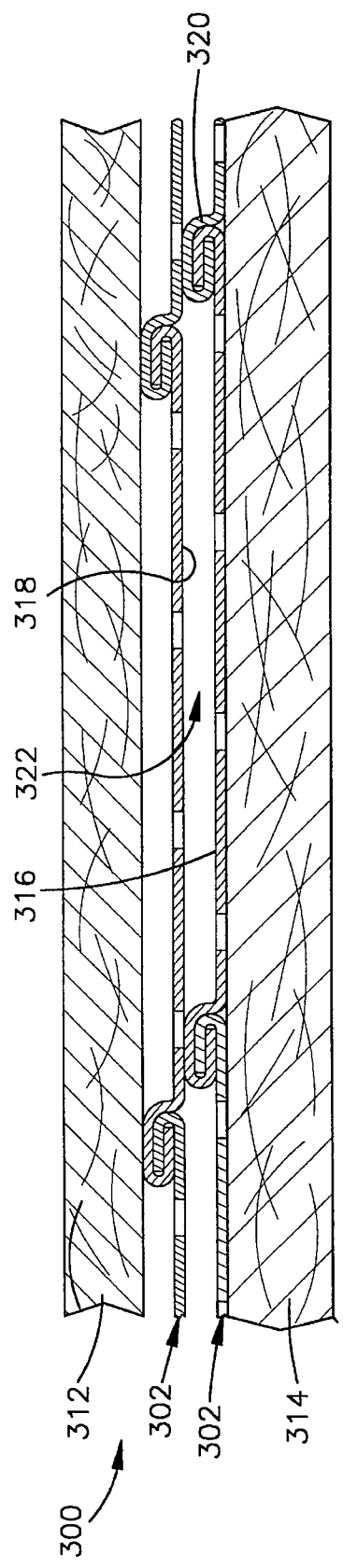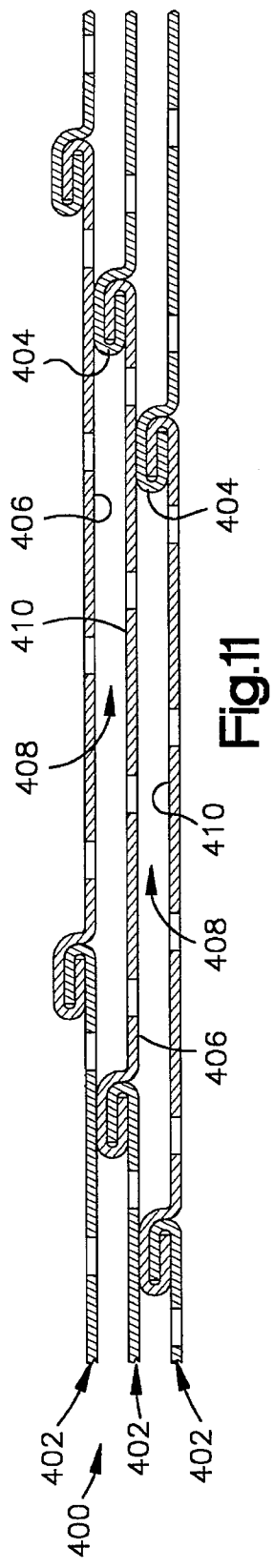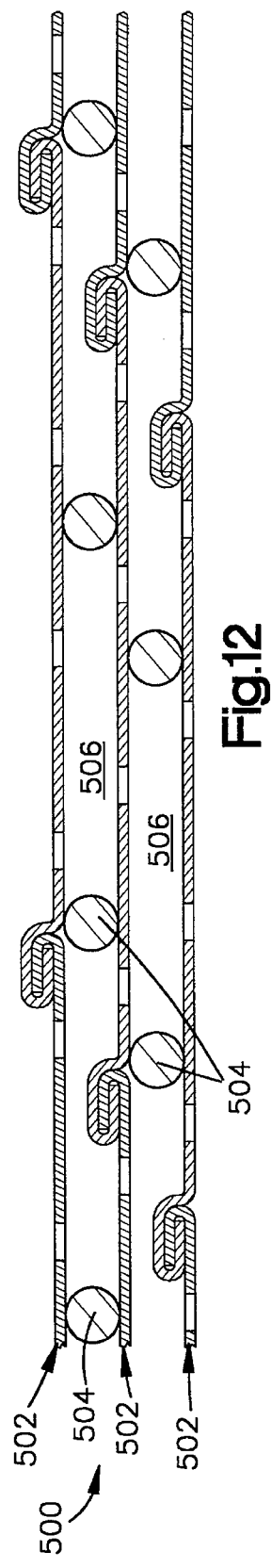

AIR BAG INFLATOR

FIELD OF THE INVENTION

The present invention relates to an inflator for inflating a vehicle occupant restraint such as an air bag.

BACKGROUND OF THE INVENTION

An inflator for inflating a vehicle occupant restraint, such as an air bag, may contain a body of ignitable gas generating material. The gas generating material is ignited when the vehicle experiences a collision for which inflation of the air bag is desired to protect an occupant of the vehicle. As the gas generating material burns, it generates a large volume of gas which is directed to flow from the inflator into the air bag to inflate the air bag. When the air bag is inflated, it extends into the vehicle occupant compartment to restrain an occupant of the vehicle from forcefully striking parts of the vehicle.

Such an inflator commonly has an elongated cylindrical housing. The housing includes an inner tubular wall and an outer tubular wall. A cylindrical filter is contained in the housing concentrically between the tubular walls. The inner tubular wall defines a cylindrical combustion chamber in which the body of gas generating material is contained. A plurality of gas flow openings extend through the inner tubular wall and direct the gas to flow radially outward from the combustion chamber and through the filter toward the outer tubular wall. A plurality of gas flow openings extending through the outer tubular wall similarly direct the gas to flow radially outward from the housing toward the air bag.

SUMMARY OF THE INVENTION

In accordance with the present invention, an apparatus for inflating a vehicle occupant restraint comprises an ignitable gas generating material, initiator means for igniting the gas generating material, and means for defining a combustion chamber containing the gas generating material.

The means for defining a combustion chamber comprises a tubular wall with a central axis. A plurality of gas flow openings extend radially outward from the combustion chamber through the tubular wall. A tubular filter extends circumferentially and axially over the tubular wall. The tubular wall comprises means for defining a space which extends radially outward from the gas flow openings to the filter.

In a preferred embodiment of the present invention, the space defined by the tubular wall comprises a plenum through which the gas can be diffused upon flowing radially outward from the gas flow openings to the filter. The means for defining the space comprises a radially projecting rib on the tubular wall. The rib extends circumferentially around the tubular wall, and axially along the tubular wall, in a helical configuration.

More specifically, the tubular wall comprises an elongated wall member with a pair of longitudinally extending side edges. The wall member has a helical configuration in which the side edges extend in helical paths alongside each other. The rib comprises a helically extending crimp means for joining the side edges to each other. The rib, and hence the space defined by the rib, thus has a helical shape extending circumferentially entirely around the tubular wall in a plurality of helical turns. The space is preferably open and free of obstructions through its entire length and width so that the plenum extends throughout the entire space.

When the gas generating material is ignited by the initiator means, it rapidly generates a large volume of gas for inflating the vehicle occupant restraint. The gas flows radially outward from the combustion chamber through the gas flow openings in the tubular wall. The gas then flows throughout the plenum, and is thus diffused over a wide flow area before entering the filter. As a result, the gas flows radially outward through the filter more evenly than it would if it were to enter the filter directly from the gas flow openings in the tubular wall.

BRIEF DESCRIPTION OF THE DRAWINGS

Further features of the present invention will become apparent to those skilled in the art to which the present invention relates from reading the following description with reference to the accompanying drawings, in which:

FIG. 9 is a partial view, partly in section, of parts of an inflator comprising a second embodiment of the present invention;

FIG. 10 is a partial view, partly in section, of parts of an inflator comprising a third embodiment of the present invention;

FIG. 11 is a partial view, partly in section, of parts of an inflator comprising a fourth embodiment of the present invention;

FIG. 12 is a partial view, partly in section, of parts of an inflator comprising a fifth embodiment of the present invention.

DESCRIPTION OF PREFERRED EMBODIMENTS

Figure 1:
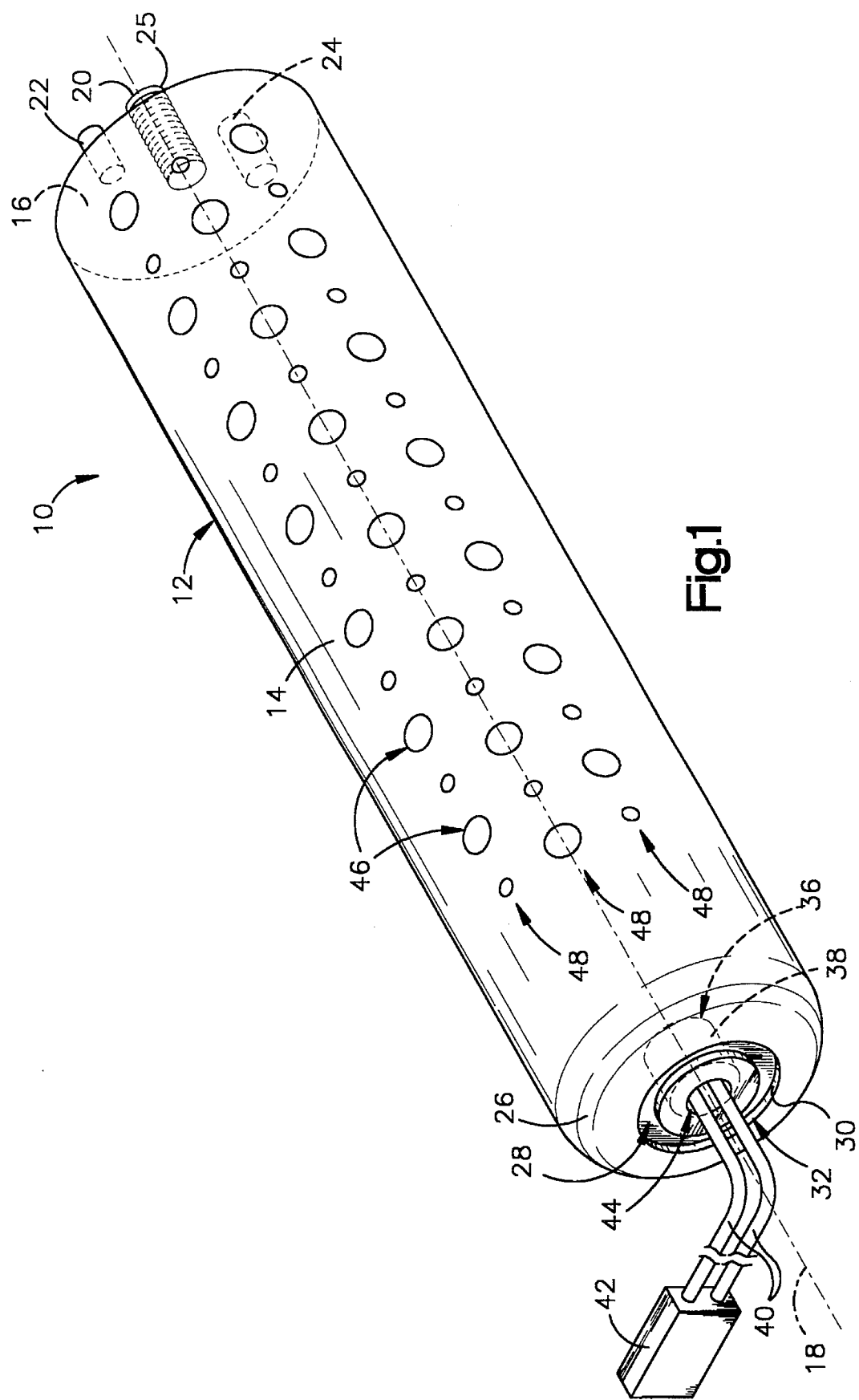
FIG. 1 is a perspective view of an inflator comprising a first embodiment of the present invention.

An inflator 10 comprising a first embodiment of the present invention is shown in FIG. 1. The inflator 10 has a cylindrical housing 12 which contains a source of inflation fluid for inflating an inflatable vehicle occupant restraint (not shown) which is commonly referred to as an air bag. The source of inflation fluid preferably comprises an ignitable gas generating material. When the inflator 10 is actuated, the gas generating material is ignited. The gas generating material then generates a large volume of gas for inflating the air bag.

The housing 12 has an elongated tubular body wall 14 and a circular end wall 16, each of which is centered on a longitudinal central axis 18. The end wall 16 closes one end of the housing 12, and supports a plurality of mounting studs 20, 22, and 24 for mounting the inflator 10 in a reaction canister (not shown). The reaction canister is a known part which contains and supports the inflator 10 in a vehicle. The first mounting stud 20 is centered on the axis 18, and has a screw thread 25 for receiving a threaded fastener. The second and third mounting studs 22 and 24 are unthreaded, and are sized differently from each other so as to be receivable in respective alignment openings in the reaction canister. The second and third mounting studs 22 and 24 thus ensure that the inflator 10 will be installed in the reaction canister in a predetermined orientation.

The opposite end of the housing 12 is closed in part by an end portion 26 of the tubular wall 14, and in part by an end cap 28 which is received coaxially within the tubular wall 14. The end portion 26 of the tubular wall 14 has a dome-shaped contour, and extends closely over a dome-shaped portion of the end cap 28. The end portion 26 of the tubular wall 14 further has an annular edge surface 30 which defines a circular opening 32 centered on the axis 18. An annular elastomeric seal 34 (FIG. 2) is compressively engaged between the end cap 28 and the end portion 26 of the tubular wall 14. The housing 12 is thus closed and sealed in accordance with the invention set forth in copending U.S. patent application Ser. No. 08/327,281, filed Oct. 21, 1994, entitled AIR BAG INFLATOR AND METHOD OF ASSEMBLY, and assigned to TRW Vehicle Safety Systems Inc.

The inflator 10 further includes an electrically actuatable initiator 36. As shown by way of example in FIG. 1, the initiator 36 is a known part which comprises a cylindrical casing 38 and a pair of electrical lead wires 40. The lead wires 40 extend from the casing 38 to an electrical terminal 42. A pyrotechnic material is contained in the casing 38, and is ignited upon the passage of electric current through the initiator 36 between the lead wires 40. When the pyrotechnic material is ignited, it produces combustion products which rupture the casing 38 and emerge rapidly from the casing 38.

The initiator 36 is supported by the end cap 28. The casing 38 is located coaxially within the tubular wall 14, with the lead wires 40 extending outward from the casing 38 through a central opening 44 in the end cap 28 and further through the opening 32 in the tubular wall 14. The casing 38 is thus supported in a position from which it directs the combustion products into contact with the gas generating material in the housing 12 so as to ignite the gas generating material upon actuation of the initiator 36.

When the gas generating material in the housing 12 is ignited, it rapidly generates a large volume of gas which emerges from the housing 12 through a plurality of outlet openings 46 in the tubular wall 14. The gas is then directed from the inflator 10 to the air bag by the reaction canister and/or by a diffuser or manifold structure (not shown), as known in the art.

The outlet openings 46 are closely spaced from each other in parallel rows 48 which extend axially along nearly the entire length of the tubular wall 14. The rows 48 of outlet openings 46 are, in turn, closely spaced from each other in an array extending partially around the circumference of the tubular wall 14. The tubular wall 14 has a similar array of additional outlet openings (not shown) at a location diametrically opposite to the location of the array of openings 46. However, unlike the openings 46, the additional openings are not intended to direct gas toward the air bag, but instead are intended to vent gas away from the air bag if the pressure of the gas exceeds a predetermined elevated level. Such additional openings are known in the art, and preferably have a substantially lesser total flow area in comparison with the total flow area of the openings 46.

Figure 2:
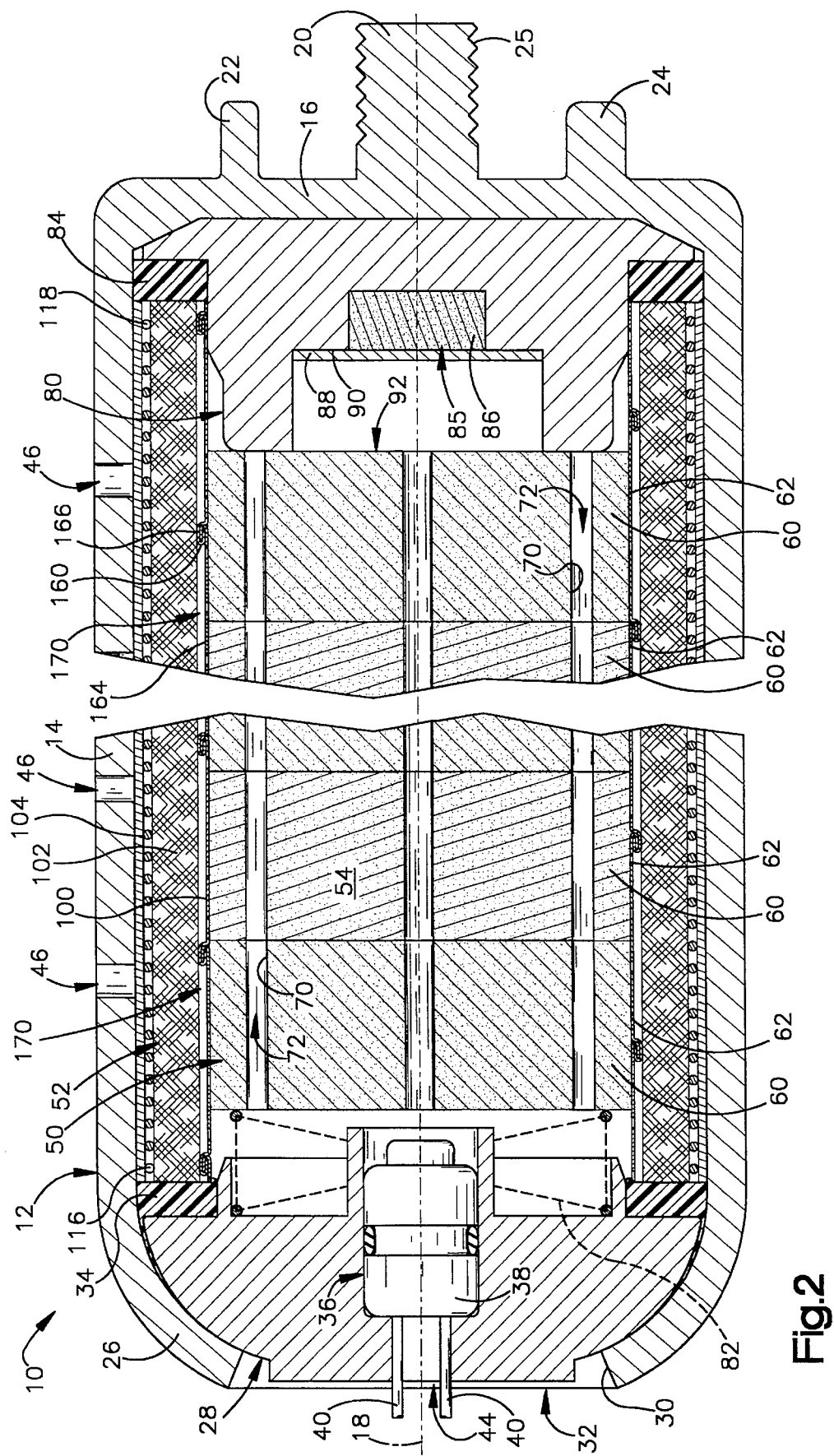
FIG. 2 is a sectional view of the inflator of FIG. 1.

As shown in FIG. 2, the gas generating material in the housing 12 takes the shape of an elongated cylindrical body 50. The housing 12 also contains an elongated tubular structure 52. The tubular structure 52 defines a cylindrical combustion chamber 54 in which the elongated cylindrical body 50 of gas generating material is contained.

The elongated cylindrical body 50 of gas generating material is defined by a plurality of separate, shorter cylindrical bodies 60 of gas generating material which are known as grains. The gas generating material of which the grains 60 are formed is an ignitable material which rapidly generates a large volume of gas when ignited, as described briefly above. The gas generating material may have any suitable composition known in the art, and the grains 60 may have any suitable configuration known in the art.

Figure 3:
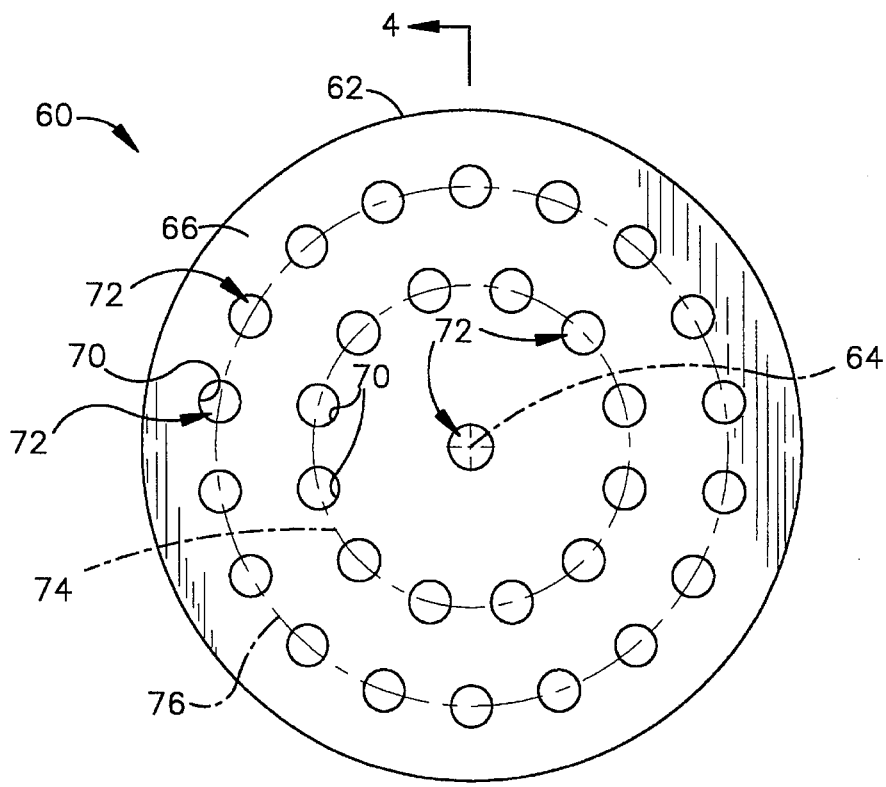
FIG. 3 is an enlarged view of a part shown in FIG. 2.
Figure 4:
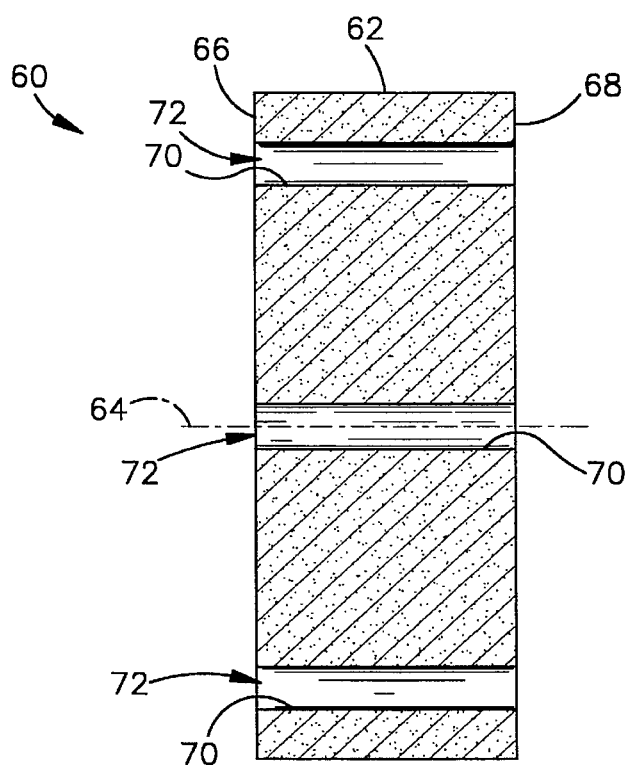
FIG. 4 is a view taken on line 4—4 of FIG. 3.

As an example of the different grains of gas generating material that may be used in the inflator 10, the configuration of one such grain 60 is shown in detail in FIGS. 3 and 4. The grain 60 has a cylindrical outer surface 62 centered on an axis 64. The grain 60 further has first and second opposite side surfaces 66 and 68. Each of the side surfaces 66 and 68 has a circular shape centered on the axis 64, and is generally perpendicular to the axis 64.

The grain 60 preferably has a plurality of cylindrical inner surfaces 70, each of which defines a respective cylindrical passage 72 extending axially through the grain 60. The number and arrangement of the cylindrical inner surfaces 70 may vary. As shown by way of example in FIGS. 3 and 4, one of the cylindrical inner surfaces 70 is centered on the axis 64, and the other cylindrical inner surfaces 70 are arranged in first and second circular arrays. The first circular array of the cylindrical inner surfaces 70 extends circumferentially around the axis 64 on a first circular line 74. The first circular line 74 is centered on the axis 64. The second circular array of the cylindrical inner surfaces 70 extends circumferentially around the axis 64 on a second circular line 76. The second circular line 76 also is centered on the axis 64, and is spaced radially outward from the first circular line 74. Moreover, each of the cylindrical inner surfaces 70 in the second circular array is at least partially offset circumferentially from each of the cylindrical inner surfaces 70 in the first circular array.

Each of the grains 60 of gas generating material preferably has an ignition-enhancing coating formed of a pyrotechnic material. The pyrotechnic material of which the coatings are formed does not generate a significant amount of gas for inflating the air bag, but is more readily ignitable than the gas generating material of which the grains 60 are formed. The pyrotechnic material may have any suitable composition known in the art. Alternatively, the grains 60 of gas generating material could be free of such coatings.

The grains 60 of gas generating material are received coaxially within the combustion chamber 54 to define the body 50 of gas generating material, as shown in FIG. 2. A circular spacer 80 and coil spring 82 (shown schematically) also are contained in the housing 12, and are located at opposite ends of the combustion chamber 54.

The spacer 80 is seated closely against the end wall 16 of the housing 12, and spaces the body 50 of gas generating material axially from the end wall 16. The spacer 80 is preferably constructed in accordance with the invention set forth in copending U.S. patent application Ser. No. 08/358,788, filed Dec. 16, 1994, entitled AIR BAG INFLATOR AND METHOD OF ASSEMBLY, and assigned to TRW Vehicle Safety Systems Inc. As described in that copending application, an annular elastomeric seal 84 is stretched circumferentially and radially over the spacer 80.

A compartment 85 at the center of the spacer 80 contains an optional body 86 of auto-ignition material. The body 86 of auto-ignition material is held in the compartment 85 by a sheet 88 of metal foil or the like which is adhered to an inner surface 90 of the spacer 80. The auto-ignition material ignites and emits combustion products automatically when its temperature reaches a predetermined elevated level, and may have any suitable composition known in the art. The combustion products emitted from the body 86 of auto-ignition material rupture the sealing sheet 88 and emerge from the spacer 80 through an opening 92 adjacent to the body 50 of gas generating material. Those combustion products thus move against the adjacent grain 60 of gas generating material in the combustion chamber 54 to ignite the body 50 automatically when ambient conditions cause the temperature of the inflator 10 to reach the predetermined elevated level.

The coil spring 82 at the opposite end of the combustion chamber 54 is compressed axially between the end cap 28 and the first grain 60 of gas generating material adjacent to the end cap 28. The coil spring 82 thus presses the body 50 of gas generating material axially against the spacer 80, and holds the grains 60 of gas generating material together firmly enough to prevent them from rattling within the housing 12.

As shown in FIG. 2, the tubular structure 52 extends axially within the housing 12 from the seal 34 at the end cap 28 to the seal 84 at the spacer 80. The tubular structure 52 includes a tubular inner wall 100. The inner wall 100 defines the diameter of the cylindrical combustion chamber 54. The tubular structure 52 further includes a generally cylindrical tubular filter 102 and a support wire 104. The filter 102 surrounds the inner wall 100. The support wire 104 surrounds the filter 102.

Figure 5:
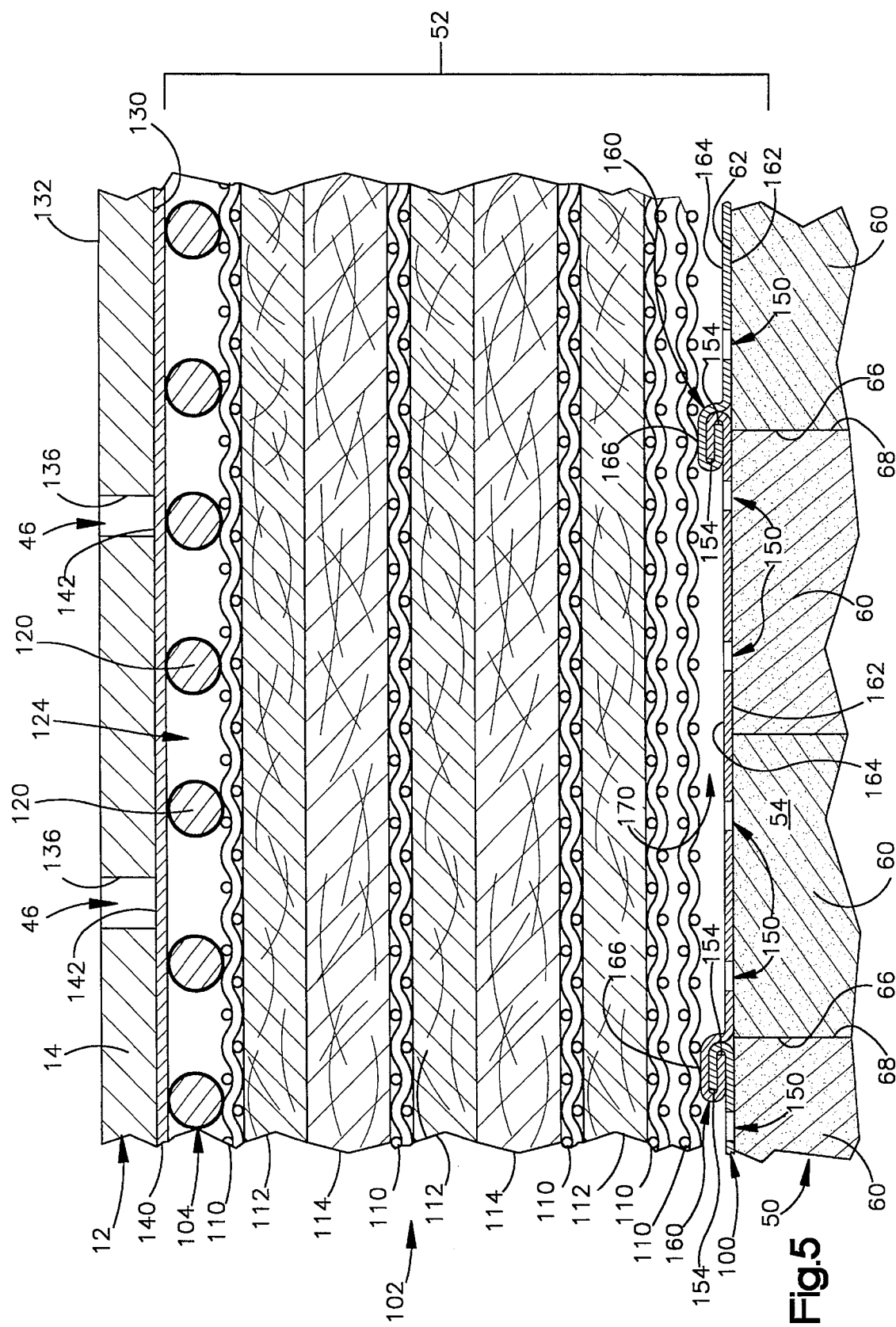
FIG. 5 is an enlarged partial view of parts shown in FIG. 2.

As shown in detail in FIG. 5, the filter 102 has a plurality of generally cylindrical filter layers, including layers 110 of wire mesh screen, layers 112 of steel wool, and layers 114 of ceramic/glass wool. The layers 110, 112 and 114 of the filter 102 are preferably formed by laying out flat, flexible sheets of steel wool and ceramic/glass wool in overlying relationship with a flat, flexible sheet of wire mesh screen, and by winding the overlying sheets around the inner wall 100 of the tubular structure 52.

The support wire 104 extends circumferentially and axially over the filter 102. More specifically, the support wire 104 has opposite ends 116 and 118 (FIG. 2) which are fixed to the filter 102 by welds (not shown), and extends over the filter 102 in a helical configuration. The support wire 104 thus has a plurality of successive helical sections 120 (FIG. 5) which are spaced from each other axially to define a helical gap 124. The width of the gap 124 can be varied, but is preferred to be substantially greater than the widths of the openings in the underlying layers 110 of wire mesh screen in the filter 102.

As further shown in FIG. 5, the tubular wall 14 of the housing 12 has a cylindrical inner side surface 130, a cylindrical outer side surface 132, and a plurality of cylindrical inner edge surfaces 136 which define the outlet openings 46. A sheet 140 of rupturable pressure controlling material, which is preferably formed of aluminum, extends circumferentially around the inner side surface 130 of the tubular housing wall 14 in continuous contact with the inner side surface 130. The sheet 140 thus has a plurality of individual circular portions 142, each of which extends across the inner end of a respective one of the outlet openings 46.

The sheet 140 of rupturable pressure controlling material is preferably adhered to the inner side surface 130 of the tubular housing wall 14 before the tubular structure 52 is installed in the housing 12. When the tubular structure 52 is subsequently installed in the housing 12, it is moved longitudinally into the housing 12 axially toward the end wall 16, i.e., from left to right as viewed in FIG. 2. The support wire 104 at the periphery of the tubular structure 52 then slides against the sheet 140 of rupturable pressure controlling material in helical line contact. The line contact helps prevent the outermost layer 110 of wire mesh screen in the filter 102 from tearing the sheet 140 of rupturable pressure controlling material.

Figure 6:
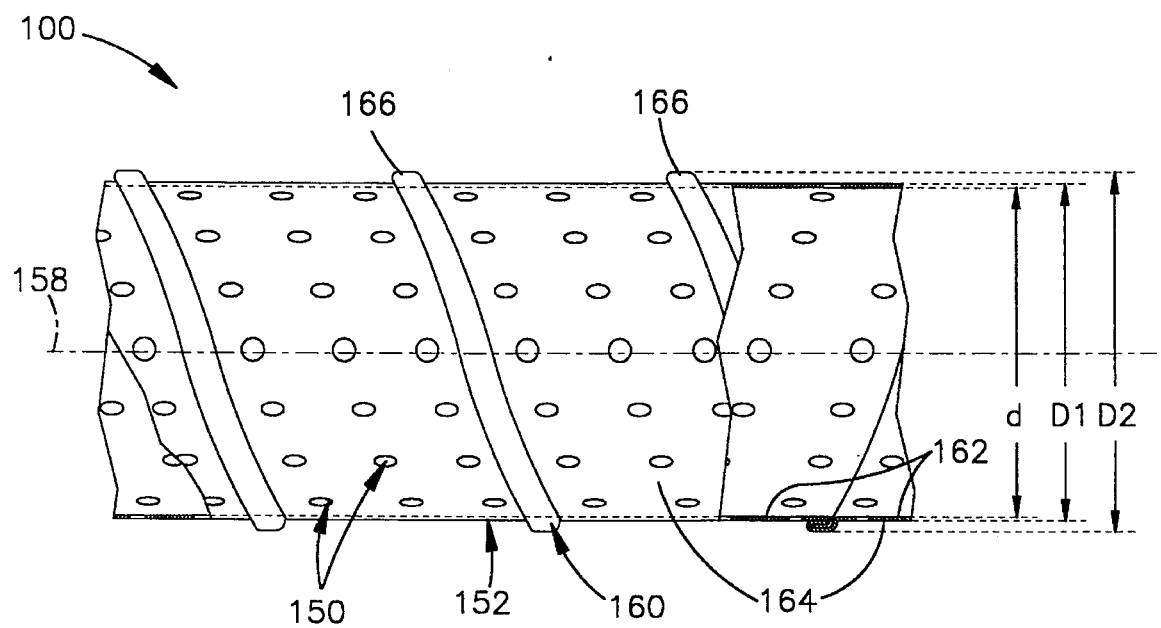
FIG. 6 is an enlarged partial view, partly in section, of a part shown in FIG. 2.
Figure 7:
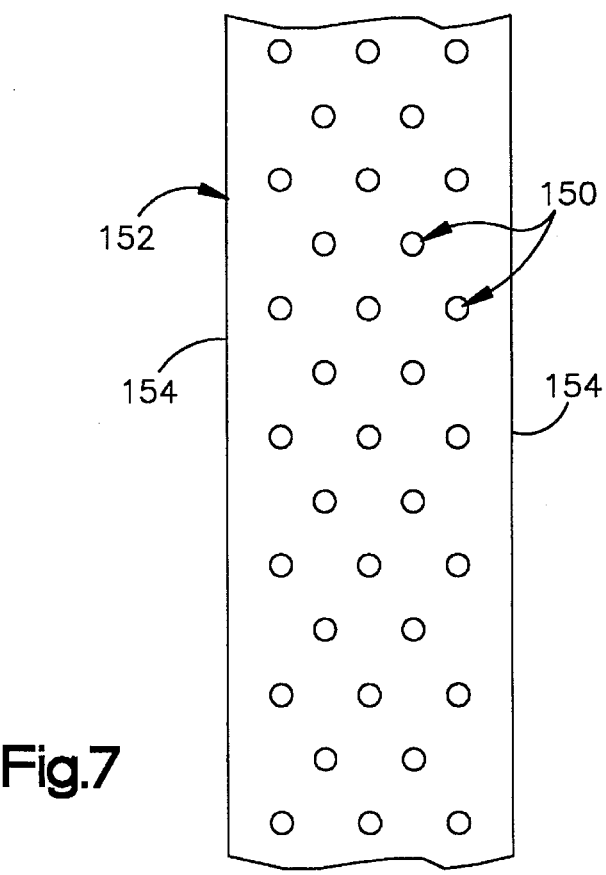
FIG. 7 is a view showing the part of FIG. 6 in a partially assembled condition.

The inner wall 100 of the tubular structure 52 is formed of sheet metal which is perforated to define a plurality of gas flow openings 150. In the preferred embodiment of the present invention shown in the drawings, the inner wall 100 comprises a strip 152 (FIG. 7) of perforated sheet metal with a pair of longitudinally extending side edges 154. The strip 152 is shaped as an elongated cylinder, as shown in FIG. 6, by winding the strip 152 around an axis 158 in a helical configuration. Each side edge 154 of the strip 152 then extends around the axis 158 in a helical path alongside the other side edge 154. The adjacent helical side edges 154 are joined to each other by a crimp 160. As shown in FIG. 6, the crimp 160 likewise extends around the axis 158 in a helical path.

The inner wall 100 has a substantially constant inner diameter d. The inner diameter d is defined by a major inner surface 162 of the strip 152 which extends axially between adjacent helical sections of the crimp 160. The inner wall 100 further has a first outer diameter D1. The first outer diameter D1 is similarly defined by a major outer surface 164 of the strip 152 which extends axially between adjacent helical sections of the crimp 160. Moreover, the crimp 160 projects radially outward from the major outer surface 164, and has a helically extending peripheral surface 166. The peripheral surface 166 of the crimp 160 defines a second outer diameter D2 which is somewhat greater than the first outer diameter D1.

The peripheral surface 166 of the crimp 160 is the radially outermost surface of the inner wall 100. Therefore, the radially innermost layer 110 of the filter 102 extends circumferentially around the inner wall 100 in contact with the peripheral surface 166, as shown in FIG. 5, when the filter layers 110, 112 and 114 have been wrapped around the inner wall 100. The crimp 160 thus spaces the innermost filter layer 110 radially outward from the major outer surface 164 of the inner wall 100. As a result, a gas flow plenum 170 is provided in the space extending radially between the innermost filter layer 110 and the gas flow openings 150 at the major outer surface 164. In the preferred embodiments of the present invention shown in the drawings, that space is continuously open and free of obstructions throughout its entire length and width between the inner wall 100 and the filter 102. The plenum 170 thus has a radial extent which is equal to the difference between the first and second outer diameters D1 and D2 (FIG. 6) of the inner wall 100. Moreover, the plenum 170 has a helical shape which is circumferentially and axially coextensive with the major outer surface 164 of the inner wall 100. The plenum 170 thus has a length extending circumferentially entirely around the axis 158 in a plurality of helical turns, and has a width extending axially between adjacent helical sections of the crimp 160.

The inner wall 100 can be constructed by any suitable technique known in the art. For example, such a perforated, tubular sheet metal structure has been constructed to order for the present inventors by New Can Co. Incorporated, of Holbrook, Mass.

Figure 8:
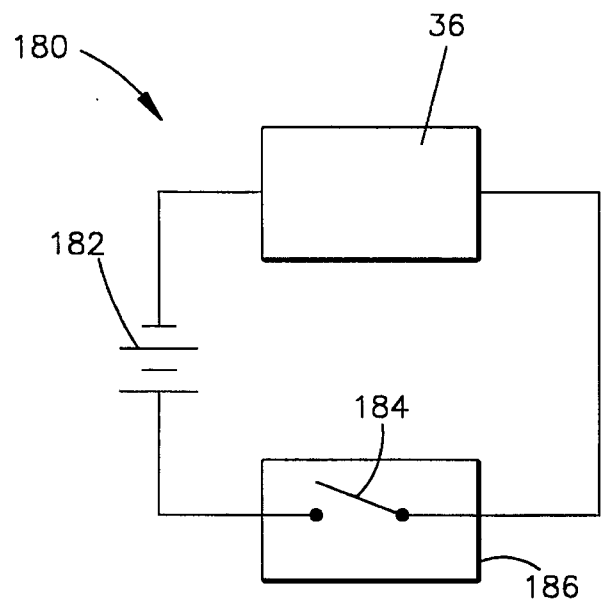
FIG. 8 is a schematic view of an electrical circuit including a part of the inflator of FIG. 1.

When the inflator 10 is installed in a vehicle as described above, the initiator 36 is included in an electrical circuit 180. As shown schematically in FIG. 8, the electrical circuit 180 further includes a power source 182, which is preferably the vehicle battery and/or a capacitor, and a normally open switch 184. The switch 184 is preferably part of a sensor 186 which senses a vehicle condition indicative of a collision. The collision-indicating condition may comprise, for example, vehicle deceleration that is caused by a collision. If the collision-indicating condition is above a predetermined threshold, it indicates the occurrence of a collision for which inflation of the air bag is desired to protect an occupant of the vehicle. The sensor 186 closes the switch 184 upon sensing such a collision-indicating condition.

When the switch 184 in the circuit 180 is closed, electric current is directed through the initiator 36 between the lead wires 40 (FIG. 2). The pyrotechnic material in the initiator 36 is then ignited and, as described above, spews combustion products into the housing 12. The combustion products emerging from the initiator 36 move against and ignite the first grain 60 of gas generating material adjacent to the end cap 28.

When the first grain 60 of gas generating material is ignited, it rapidly generates gas for inflating the air bag. It also produces and emits additional combustion products including heat and hot particles. Some of those combustion products move into contact with second grain 60 of gas generating material. As a result, the second grain 60 of gas generating material also is ignited and, in turn, emits additional combustion products. This process continues along the length of the elongated body 50 of gas generating material as all of the grains 60 are ignited successively. The ignitable surface areas provided by the cylindrical inner surfaces 70, and the fluid communication provided by the passages 72, promote rapid ignition of the grains 60 in this manner. The elongated body 50 of gas generating material is thus ignited quickly along its entire length so that gas for inflating the air bag is generated quickly along the entire length of the elongated body 50.

The combustion chamber 54 is fully closed and sealed at its axially opposite ends by the end cap 28, the spacer 80, and the elastomeric seals 34 and 84. The gas generated upon combustion of the gas generating material is thus constrained to flow outward from the combustion chamber 54 only through the gas flow openings 150 in the inner wall 100. The gas subsequently flows radially outward through the filter 102. However, the gas first flows through the plenum 170 before entering the filter 102.

Specifically, the gas enters the plenum 170 in a plurality of concentrated flows which emerge from the gas flow openings 150 at the major outer surface 164 of the inner wall 100. As the gas flows radially outward across the plenum 170, some of the gas flows circumferentially and axially throughout the length and width of the plenum 170. As a result, the flow of gas entering the filter 102 is diffused substantially throughout the innermost filter layer 110, rather than being concentrated only at locations that are directly opposed to the gas flow openings 150. The gas then flows evenly throughout the overlying layers 110, 112 and 114 of the filter 102.

When the filtered gas emerges from the outermost filter layer 110, it continues to flow radially outward toward the tubular housing wall 14 through the gap 124 defined by the support wire 104. The sheet 140 of rupturable pressure controlling material initially contains the gas within the housing 12. When the pressure of the gas acting radially outward against the sheet 140 reaches a predetermined elevated level, it ruptures the circular portions 142 of the sheet 140 which extend across the inner ends of the outlet openings 46. The gas then emerges from the inflator 10 through the outlet openings 46.

A second embodiment of the present invention is shown partially in FIG. 9. The second embodiment includes an alternative filter 200 in place of the filter 102 described above. The filter 200 has a plurality of generally cylindrical filter layers including layers 210 of wire mesh screen, layers 212 of steel wool, and layers 214 of ceramic/glass wool. The filter 200 further includes one or more perforated tubular walls 220 with radially extending gas flow openings 222. Each tubular wall 220 has the same cylindrical configuration as the tubular wall 100 described above. Each tubular wall 220 is thus defined by an elongated helical wall member 224 having longitudinally extending side edges 226 which are joined to each other by a helically extending crimp 228.

In the embodiment shown in FIG. 9, one of the tubular walls 220 in the filter 200 is located radially between, and adjoins, a layer 214 of ceramic/glass wool and an adjacent layer 212 of steel wool. Another tubular wall 220 is located radially between, and adjoins, a layer 212 of steel wool and an adjacent layer 210 of wire mesh screen. Each tubular wall 220 shown in FIG. 9 defines a corresponding plenum 230 in the same manner as described above with reference to the tubular wall 100 and the plenum 170.

A third embodiment of the present invention includes a filter 300, as shown partially in FIG. 10. Like the filter 200 of FIG. 9, the filter 300 of FIG. 10 includes perforated tubular walls 302 with cylindrical configurations that are the same as the cylindrical configuration of the tubular wall 100 described above. In the filter 300, a radially adjacent pair of the tubular walls 302 adjoin each other between a radially adjacent pair of filter layers 314 and 312. The adjoining tubular walls 302 have opposed cylindrical surfaces 316 and 318 that are spaced from each other by the crimp 320 located therebetween. A plenum 322 is thus defined between the opposed cylindrical surfaces 316 and 318.

A fourth embodiment of the present invention is shown partially in FIG. 11. In the fourth embodiment, a tubular filter 400 includes a plurality of perforated tubular walls 402 which adjoin each other in a concentric array. Each tubular wall 402 has the same cylindrical configuration as the tubular wall 100 described above. The tubular walls 402 in each radially adjacent pair adjoin each other in helically extending contact between a crimp 404 and an opposed cylindrical surface 406. A plurality of plenums 408 are thus defined between the opposed cylindrical surfaces 406 and 410 that are spaced from each other by the crimps 404.

A fifth embodiment of the present invention includes a filter 500, as shown partially in FIG. 12. The filter 500 includes a plurality of concentric, perforated tubular walls 502 with the same cylindrical configurations as the tubular walls 402 of FIG. 11. In the filter 500, the tubular walls 502 in each radially adjacent pair are spaced from each other by a corresponding spacer structure 504. Each spacer structure 504 preferably comprises a spacer wire which extends between the corresponding pair of radially adjacent tubular walls 502 along a helical path, as shown in FIG. 12. Alternatively, the spacer wires 504 could extend between the tubular walls 502 in circular paths. In any case, each spacer wire 504, or other suitable spacer structure, defines the radial extent of a corresponding plenum 506 between the corresponding spaced pair of tubular walls 502.

Figure 13:
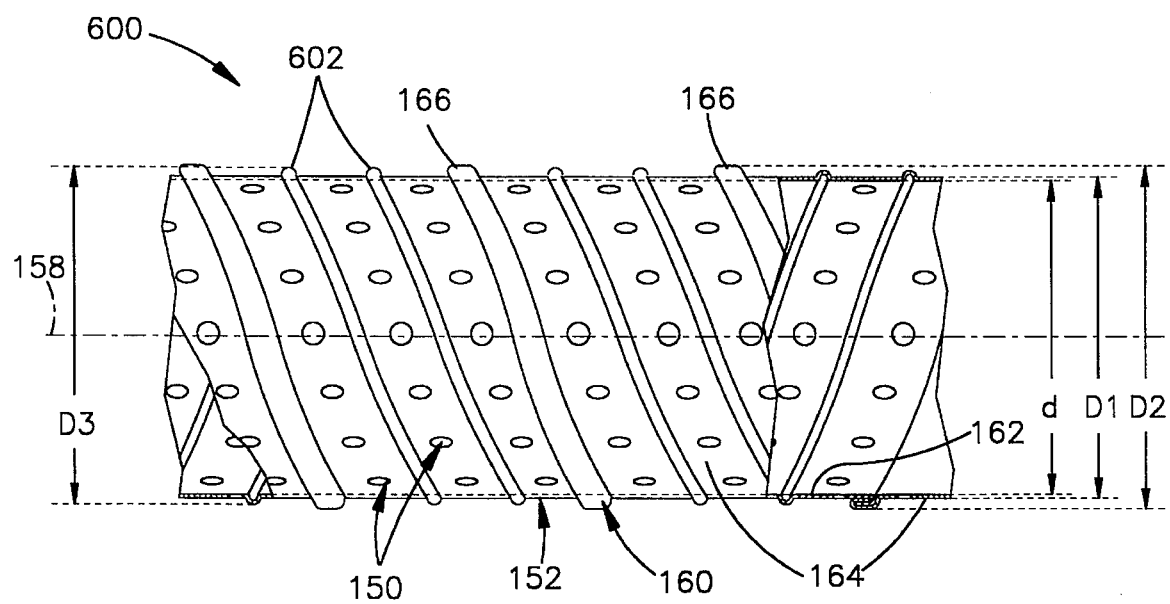
FIG. 13 is a partial view, partly in section, of a part of an inflator comprising a sixth embodiment of the present invention.

In a sixth embodiment of the present invention, the tubular structure 52 in the inflator 10 (FIG. 2) has an alternative inner wall 600 (FIG. 13) in place of the inner wall 100 described above. As indicated by the same reference numbers used in FIGS. 6 and 13, the inner wall 600 has parts that are substantially the same as corresponding parts of the inner wall 100. The inner wall 600 further has reinforcing ribs 602 extending helically around the axis 158. The ribs 602 project radially outward from the major outer surface 164 of the inner wall 600. The ribs 602 thus define a third outer diameter D3 of the inner wall 600. The third outer diameter D3 defined by the ribs 602 is less than the second outer diameter D2 defined by the crimp 160. This ensures that the ribs 602 will not block gas from flowing axially through a plenum defined by the inner wall 600. The inner wall 600 could also be used as a substitute for one or more of the other tubular walls 220, 302, 402 and 502 described above.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable vehicle occupant restraint, said apparatus comprising:

an ignitable gas generating material which, when ignited, generates gas for inflating the restraint;

initiator means for igniting said gas generating material;

means for defining a combustion chamber containing said gas generating material, said means for defining a combustion chamber comprising a tubular wall having a central axis and a plurality of gas flow openings extending radially outward from said combustion chamber through said tubular wall; and a tubular filter extending circumferentially and axially over said tubular wall;

said tubular wall comprising means for defining a space extending radially outward from said gas flow openings to said filter.

2. Apparatus as defined in claim 1 wherein said space comprises a plenum through which said gas can be diffused upon emerging from said gas flow openings, said plenum extending radially outward from said gas flow openings to said filter.

3. Apparatus as defined in claim 1 wherein said means for defining a space comprises a radially projecting rib portion of said tubular wall.

4. Apparatus as defined in claim 3 wherein said rib portion of said tubular wall extends circumferentially around and axially along said tubular wall in a helical configuration.

5. Apparatus as defined in claim 4 wherein said tubular wall comprises an elongated wall member with a pair of longitudinally extending side edges, said wall member having a helical configuration in which said side edges extend in helical paths alongside each other, said rib portion of said tubular wall comprising a helically extending crimp means for joining said side edges to each other.

6. Apparatus as defined in claim 5 wherein said space comprises a plenum through which said gas can be diffused upon emerging from said gas flow openings, said plenum extending radially outward from said gas flow openings to said filter and extending circumferentially entirely around said tubular wall in a helical configuration defined by said crimp means.

7. Apparatus as defined in claim 1 wherein said tubular wall has axially opposite ends, said apparatus further comprising means for closing and sealing said opposite ends of said tubular wall so as to prevent gas from flowing axially through said opposite ends of said tubular wall.

8. Apparatus for inflating an inflatable vehicle occupant restraint, said apparatus comprising:

an ignitable gas generating material which, when ignited, generates gas for inflating the restraint;

initiator means for igniting said gas generating material; and a tubular structure comprising means for defining a combustion chamber, means for filtering said gas, and means for defining a gas flow plenum;

said means for defining a combustion chamber comprising a tubular wall having a central axis and a plurality of gas flow openings extending radially outward from said combustion chamber through said tubular wall;

said means for filtering said gas comprising a tubular filter extending circumferentially and axially over said tubular wall, said filter comprising a plurality of generally cylindrical filter layers including a radially innermost layer of wire mesh screen;

said plenum extending radially outward from said gas flow openings to said radially innermost layer of wire mesh screen and extending circumferentially entirely around said tubular wall;

said means for defining a plenum comprising a radially projecting rib portion of said tubular wall.

9. Apparatus as defined in claim 8 wherein said rib portion of said tubular wall extends circumferentially around and axially along said tubular wall in a helical configuration.

10. Apparatus as defined in claim 9 wherein said tubular wall comprises an elongated wall member with a pair of longitudinally extending side edges, said wall member having a helical configuration in which said side edges extend in helical paths alongside each other, said rib portion of said tubular wall comprising a helically extending crimp means for joining said side edges to each other.

11. Apparatus as defined in claim 10 wherein said tubular wall has axially opposite ends, said apparatus further comprising means for closing and sealing said opposite ends of said tubular wall so as to prevent gas from flowing axially through said opposite ends of said tubular wall.

12. Apparatus for inflating an inflatable vehicle occupant restraint, said apparatus comprising:

a source of inflation fluid for inflating the restraint;

a tubular wall surrounding said source, said tubular wall having a central axis and a plurality of radially extending openings, said tubular wall further having a cylindrical configuration defined by an elongated helical wall member with helically extending crimp means, said wall member having a pair of longitudinally extending side edges extending in helical paths alongside each other, said crimp means joining said side edges to each other;

means for initiating a flow of said inflation fluid from said source in response to a signal indicating the occurrence of a vehicle collision, said flow of inflation fluid following a flow path extending radially outward through said openings in said tubular wall; and a plurality of generally cylindrical layers of filter material extending circumferentially around said source;

said tubular wall being located radially between a pair of said filter layers and adjoining said pair of filter layers.

13. Apparatus as defined in claim 12 wherein said tubular wall is one of a plurality of tubular walls located radially between corresponding pairs of said filter layers, each of said tubular walls having said cylindrical configuration.

14. Apparatus as defined in claim 13 wherein a radially adjacent pair of said tubular walls are spaced from each other by at least one of said layers of filter material.

15. Apparatus for inflating an inflatable vehicle occupant restraint, said apparatus comprising:

a source of inflation fluid for inflating the restraint;

a tubular wall surrounding said source, said tubular wall having a central axis and a plurality of radially extending openings, said tubular wall further having a cylindrical configuration defined by an elongated helical wall member with helically extending crimp means, said wall member having a pair of longitudinally extending side edges extending in helical paths alongside each other, said crimp means joining said side edges to each other;

means for initiating a flow of said inflation fluid from said source in response to a signal indicating the occurrence of a vehicle collision, said flow of inflation fluid following a flow path extending radially outward through said openings in said tubular wall; and means for defining a plurality of generally cylindrical layers of filter material extending circumferentially around said source;

said tubular wall being one of a pair of tubular walls which are located radially between a corresponding pair of said filter layers and which have said cylindrical configuration;

said pair of said tubular walls adjoining each other and having radially opposed cylindrical surfaces, said crimp means on one of said pair of tubular walls extending radially between said opposed cylindrical surfaces and thereby defining a space extending radially between said opposed cylindrical surfaces.

16. Apparatus as defined in claim 15 wherein said space comprises a plenum through which said inflation fluid can flow between said pair of said tubular walls.

17. Apparatus for inflating an inflatable vehicle occupant restraint, said apparatus comprising:

a source of inflation fluid for inflating the restraint;

a plurality of tubular walls surrounding said source, each of said tubular walls having a central axis and a plurality of radially extending openings; and means for initiating a flow of said inflation fluid from said source in response to a signal indicating the occurrence of a vehicle collision, said flow of inflation fluid following a flow path extending radially outward through said openings in said tubular walls;

each of said tubular walls having a cylindrical configuration defined by an elongated helical wall member with helically extending crimp means, said wall member having a pair of longitudinally extending side edges extending in helical paths alongside each other, said crimp means joining said side edges to each other;

said tubular walls being generally concentric with each other in an array which includes a plurality of radially adjacent pairs of said tubular walls, each of said radially adjacent pairs of said tubular walls having opposed cylindrical surfaces which are spaced radially from each other so as to define boundaries of a corresponding plenum through which said inflation fluid can flow radially between said opposed cylindrical surfaces;

said tubular walls in each of said radially adjacent pairs of tubular walls adjoining each other in helically extending contact between one of said crimp means and one of said opposed cylindrical surfaces.

18. Apparatus for inflating an inflatable vehicle occupant restraint, said apparatus comprising:

a source of inflation fluid for inflating the restraint;

a pair of tubular walls surrounding said source, each of said tubular walls having a central axis and a plurality of radially extending openings; and means for initiating a flow of said inflation fluid from said source in response to a signal indicating the occurrence of a vehicle collision, said flow of inflation fluid following a flow path extending radially outward through said openings in said tubular walls;

each of said tubular walls having a cylindrical configuration defined by an elongated helical wall member with helically extending crimp means, said wall member having a pair of longitudinally extending side edges extending in helical paths alongside each other, said crimp means joining said side edges to each other;

said tubular walls having opposed cylindrical surfaces which are spaced radially from each other so as to define boundaries of a plenum through which said inflation fluid can flow radially between said opposed cylindrical surfaces;

said tubular walls adjoining each other in helically extending contact between one of said crimp means and one of said opposed cylindrical surfaces.

19. Apparatus for inflating an inflatable vehicle occupant restraint, said apparatus comprising:

a source of inflation fluid for inflating the restraint;

a pair of tubular walls surrounding said source, each of said tubular walls having a central axis and a plurality of radially extending openings; and means for initiating a flow of said inflation fluid from said source in response to a signal indicating the occurrence of a vehicle collision, said flow of inflation fluid following a flow path extending radially outward through said openings in said tubular walls;

each of said tubular walls having a cylindrical configuration defined by an elongated helical wall member with helically extending crimp means, said wall member having a pair of longitudinally extending side edges extending in helical paths alongside each other, said crimp means joining said side edges to each other;

said tubular walls having opposed cylindrical surfaces which are spaced radially from each other so as to define boundaries of a plenum through which said inflation fluid can flow radially between said opposed cylindrical surfaces;

said apparatus further comprising spacer means for spacing said tubular walls radially from each other, said spacer means being located radially between said opposed cylindrical surfaces.

20. Apparatus as defined in claim 19 wherein said spacer means comprises a spacer wire extending helically between said opposed cylindrical surfaces.

21. Apparatus for inflating an inflatable vehicle occupant restraint, said apparatus comprising:

an ignitable gas generating material which, when ignited, generates gas for inflating the restraint;

initiator means for igniting said gas generating material; and a tubular structure comprising means for defining a combustion chamber, means for filtering said gas, and means for defining a gas flow plenum;

said means for defining a combustion chamber comprising a tubular wall having a central axis and a plurality of gas flow openings extending radially outward from said combustion chamber through said tubular wall;

said means for filtering said gas comprising a tubular filter extending circumferentially and axially over said tubular wall, said filter comprising a plurality of generally cylindrical layers of filter material including a radially innermost layer of filter material;

said plenum extending radially outward from said gas flow openings to said radially innermost layer of filter material and extending circumferentially entirely around said tubular wall, said plenum thus enabling said gas to be diffused axially and circumferentially throughout said radially innermost layer of filter material upon flowing through said plenum from said gas flow openings to said radially innermost layer of filter material;

said means for defining a plenum comprising a radially projecting rib portion of said tubular wall.

22. Apparatus as defined in claim 21 wherein said rib portion of said tubular wall extends circumferentially around and axially along said tubular wall in a helical configuration.

23. Apparatus as defined in claim 22 wherein said tubular wall comprises an elongated wall member with a pair of longitudinally extending side edges, said wall member having a helical configuration in which said side edges extend in helical paths alongside each other, said rib portion of said tubular wall comprising a helically extending crimp means for joining said side edges to each other.

24. Apparatus as defined in claim 23 wherein said tubular wall has axially opposite ends, said apparatus further comprising means for closing and sealing said opposite ends of said tubular wall so as to prevent gas from flowing axially through said opposite ends of said tubular wall.

* * * * *